US012614463B2

(12) United States Patent (10) Patent No.: US 12,614,463 B2
Hirose et al. (45) Date of Patent: Apr. 28, 2026

(54) HOST VEHICLE BLIND SPOT MONITORING SYSTEM AND HOST VEHICLE BLIND SPOT MONITORING METHOD

(71) Applicant: Hitachi Astemo, Ltd., Hitachinaka (JP)

(72) Inventors: Daisuke Hirose, Hitachinaka (JP);
Hiroshi Kuroda, Hitachinaka (JP);
Yukinobu Tanaka, Hitachinaka (JP)

(73) Assignee: Hitachi Astemo, Ltd., Hitachinaka (JP)

( * ) Notice: Subject to any disclaimer, the term of this
patent is extended or adjusted under 35
U.S.C. 154(b) by 105 days.

(21) Appl. No.: 18/695,643

(22) PCT Filed: Feb. 2, 2022

(86) PCT No.: PCT/JP2022/004102
§ 371 (c)(1),
(2) Date: Mar. 26, 2024

(87) PCT Pub. No.: WO2023/047616
PCT Pub. Date: Mar. 30, 2023

(65) Prior Publication Data
US 2024/0404410 A1 Dec. 5, 2024

(30) Foreign Application Priority Data
Sep. 27, 2021 (JP) ................................. 2021-156602

(51) Int. Cl.
*G08G 1/16* (2006.01)
*G01S 13/08* (2006.01)
*G01S 13/931* (2020.01)

(52) U.S. Cl.
CPC .............. *G08G 1/167* (2013.01); *G01S 13/08*
(2013.01); *G01S 13/931* (2013.01); *G01S*
*2013/9315* (2020.01)

(58) Field of Classification Search
CPC .......... G08G 1/16; G08G 1/167; G01S 13/08;
G01S 13/931; G01S 13/9315; G01S 7/00;
G01S 7/51
See application file for complete search history.

(56) References Cited

U.S. PATENT DOCUMENTS 5,808,728 A * 9/1998 Uehara ................. G01S 17/931
340/904
7,136,753 B2 * 11/2006 Samukawa ........... G01S 17/931
356/28
(Continued)

FOREIGN PATENT DOCUMENTS

| CN | 112084232 A | 12/2020 |
|---|---|---|
| EP | 3 327 696 A1 | 5/2018 |

(Continued)

OTHER PUBLICATIONS

English Translation of International Search Report issued in PCT
Application No. PCT/JP2022/004102, dated Apr. 26, 2022.

*Primary Examiner* — Tan Q Nguyen
(74) *Attorney, Agent, or Firm* — Foley & Lardner LLP

(57) ABSTRACT

There is provided a host vehicle blind spot monitoring
system having a function of identifying a target in a host
vehicle blind spot in order to respond to regulations (UNR
151, UNR 159). A host vehicle blind spot monitoring system
transmits a transmission wave to a predetermined search
area and identifies a type of an object that reflects the
transmission wave, based on detection results of a plurality
of radar devices that detect the object by using a reflected
wave received from the object. The plurality of radar devices
is arranged such that a search area of each of the radar
devices has a different vertical height from a road surface.
The host vehicle blind spot monitoring system includes an
identification processing unit that acquires a detection point
at which the object has been detected for each search area (Continued)

and distance information from the radar device to the detection point, and identifies the type of the object based on the distance information and a size of a detection area configured by the detection point.

7 Claims, 9 Drawing Sheets

(56)                     References Cited

U.S. PATENT DOCUMENTS

| | | | | |
|---|---|---|---|---|
| 2017/0229019 A1* | 8/2017 | Ichinose | ................ | G08G 1/166 |
| 2018/0364357 A1* | 12/2018 | Hasegawa | ............. | G01S 7/4911 |
| 2018/0365854 A1* | 12/2018 | Sugiura | .................. | G06V 20/64 |
| 2020/0062277 A1* | 2/2020 | Kim | ...................... | G01S 13/867 |
| 2020/0079364 A1* | 3/2020 | Min | ................ | B60W 30/18163 |
| 2021/0394753 A1* | 12/2021 | Oh | ..................... | B60W 30/0956 |
| 2022/0334220 A1* | 10/2022 | Sasaki | ................... | G01S 13/931 |
| 2024/0191987 A1* | 6/2024 | Sniegucki | ............. | G01S 13/931 |

FOREIGN PATENT DOCUMENTS

| | | |
|---|---|---|
| JP | H08-122060 | 5/1996 |
| JP | 2010-043960 A | 2/2010 |
| JP | 2011-186584 A | 9/2011 |
| JP | 2016-053915 A | 4/2016 |
| JP | 2018-088234 A | 6/2018 |
| JP | 2018-163096 A | 10/2018 |

* cited by examiner

LARGE COMMERCIAL VEHICLE

PEDESTRIAN

FRONT PROXIMITY BLIND SPOT AREA

FIG. 5

(1) WHEN PEDESTRIAN P IS DETECTED
⇒ DEPTH DIFFERENCE = SMALL, REFLECTION INTENSITY DIFFERENCE = SMALL, AND ABSOLUTE VALUE OF REFLECTION INTENSITY = SMALL

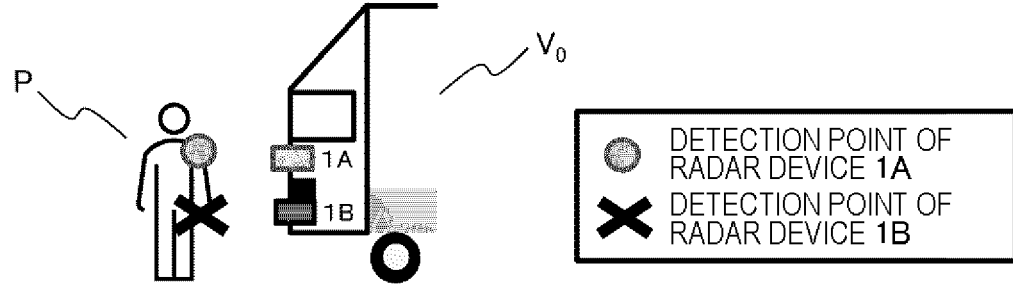

DETECTION POINT OF RADAR DEVICE 1A
DETECTION POINT OF RADAR DEVICE 1B

(2) WHEN CYCLIST C IS DETECTED
⇒ DEPTH DIFFERENCE = LARGE, REFLECTION INTENSITY DIFFERENCE = LARGE, AND ABSOLUTE VALUE OF REFLECTION INTENSITY = SMALL

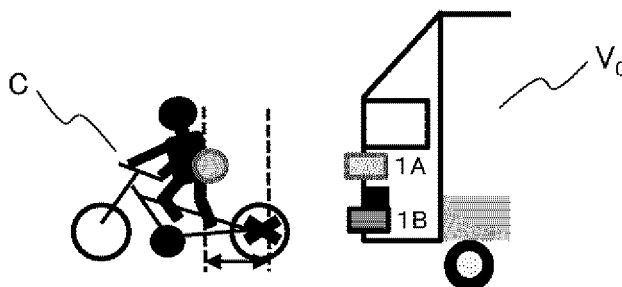

THERE IS DEPTH
(DISTANCE FROM REAR WHEEL OF BICYCLE TO BACK SURFACE OF PERSON)

(3) WHEN PRECEDING VEHICLE $V_1$ IS DETECTED
⇒ DEPTH DIFFERENCE = SMALL, REFLECTION INTENSITY DIFFERENCE = SMALL, AND ABSOLUTE VALUE OF REFLECTION INTENSITY = LARGE

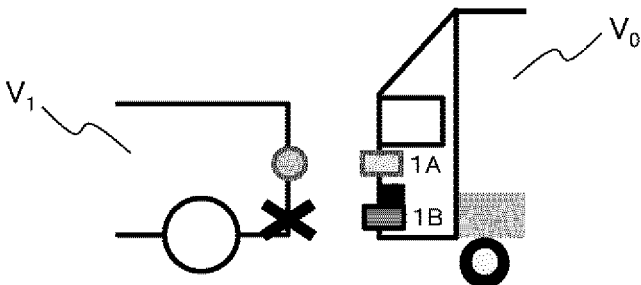

FIG. 8

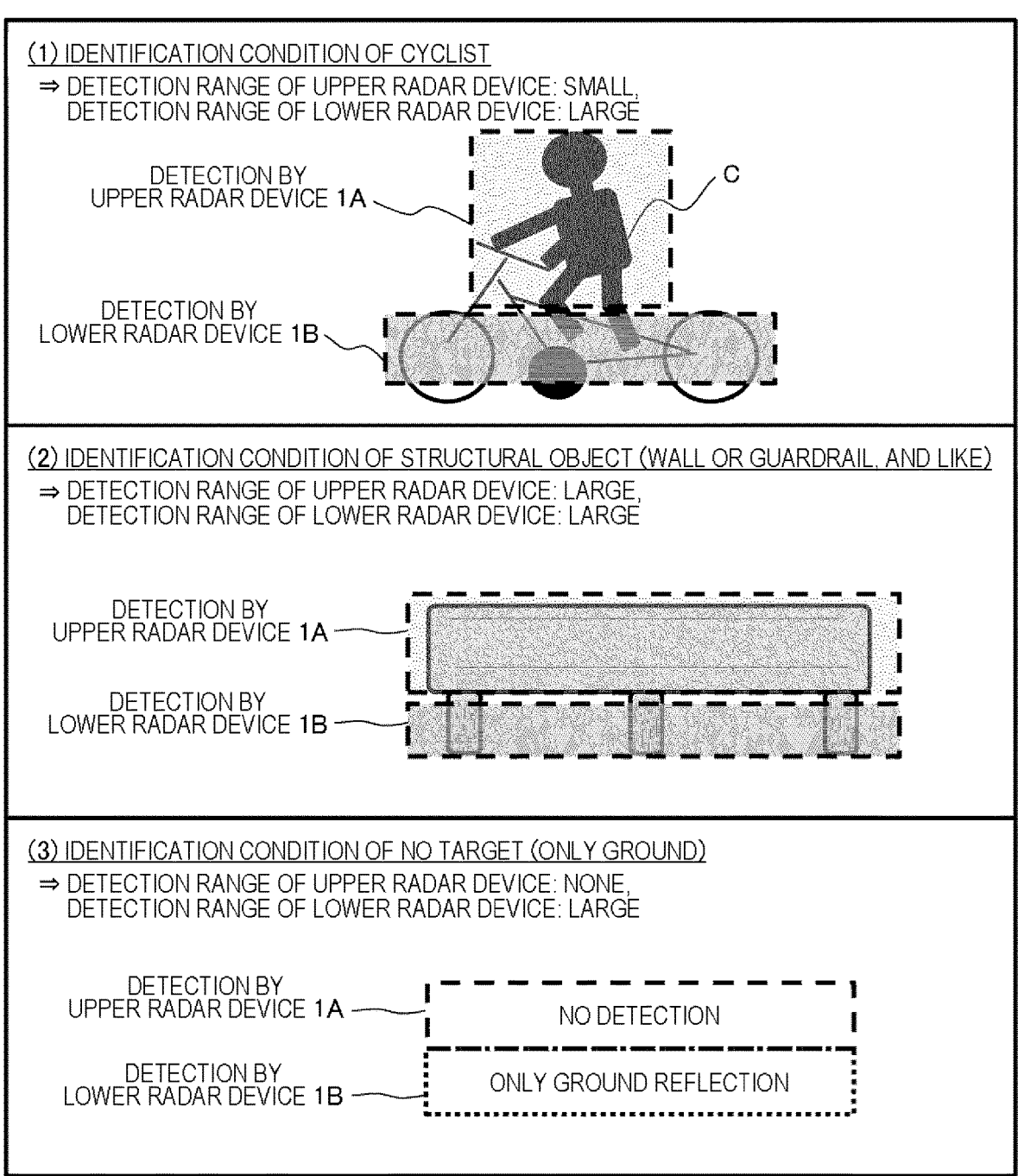

(1) IDENTIFICATION CONDITION OF CYCLIST
  ⇒ DETECTION RANGE OF UPPER RADAR DEVICE: SMALL,
     DETECTION RANGE OF LOWER RADAR DEVICE: LARGE

DETECTION BY
UPPER RADAR DEVICE 1A

C

DETECTION BY
LOWER RADAR DEVICE 1B (2) IDENTIFICATION CONDITION OF STRUCTURAL OBJECT (WALL OR GUARDRAIL, AND LIKE)
  ⇒ DETECTION RANGE OF UPPER RADAR DEVICE: LARGE,
     DETECTION RANGE OF LOWER RADAR DEVICE: LARGE

DETECTION BY
UPPER RADAR DEVICE 1A

DETECTION BY
LOWER RADAR DEVICE 1B (3) IDENTIFICATION CONDITION OF NO TARGET (ONLY GROUND)
  ⇒ DETECTION RANGE OF UPPER RADAR DEVICE: NONE,
     DETECTION RANGE OF LOWER RADAR DEVICE: LARGE

DETECTION BY
UPPER RADAR DEVICE 1A

NO DETECTION

DETECTION BY
LOWER RADAR DEVICE 1B

ONLY GROUND REFLECTION

FIG. 10

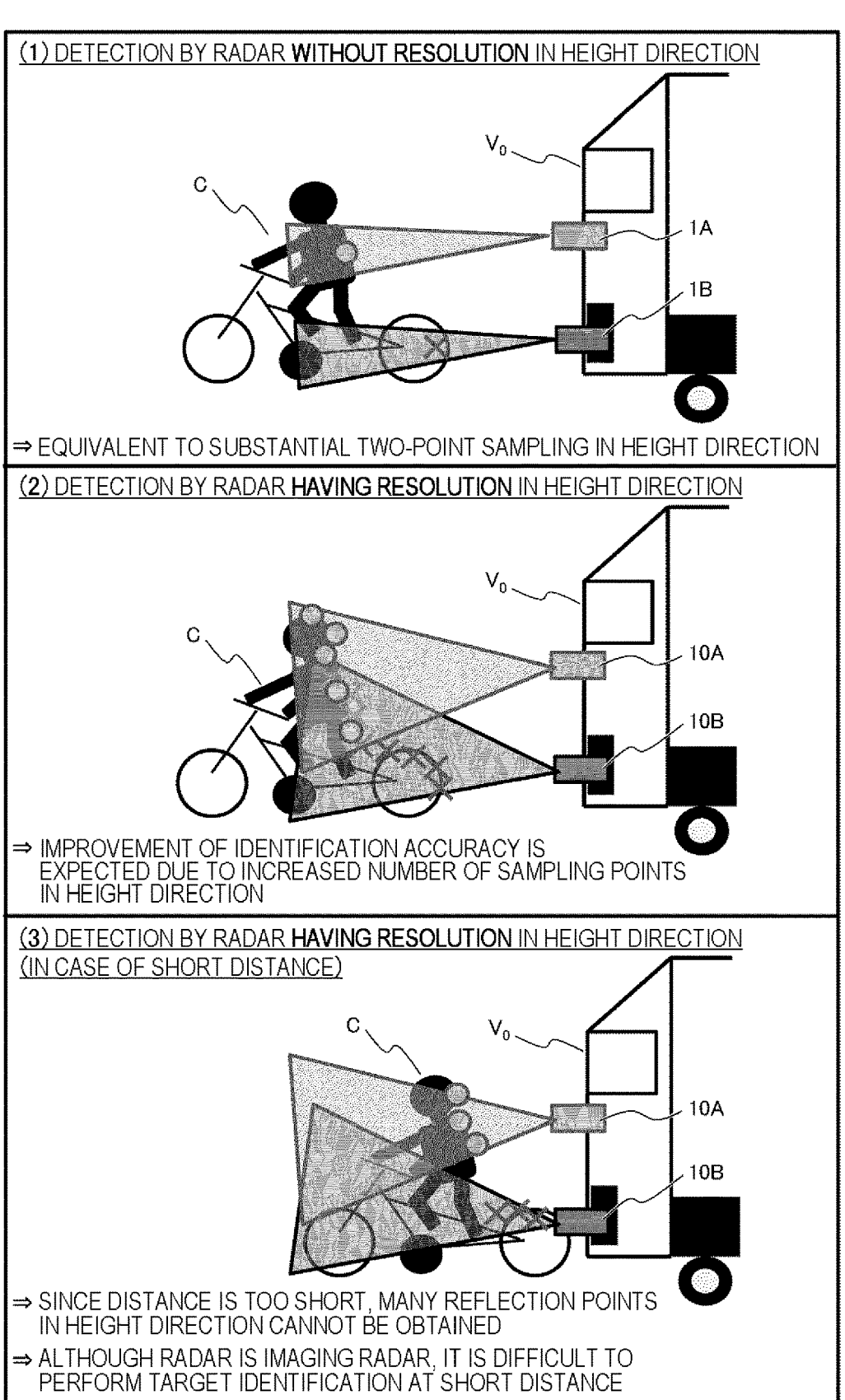

(1) DETECTION BY RADAR WITHOUT RESOLUTION IN HEIGHT DIRECTION

⇒ EQUIVALENT TO SUBSTANTIAL TWO-POINT SAMPLING IN HEIGHT DIRECTION (2) DETECTION BY RADAR HAVING RESOLUTION IN HEIGHT DIRECTION

⇒ IMPROVEMENT OF IDENTIFICATION ACCURACY IS EXPECTED DUE TO INCREASED NUMBER OF SAMPLING POINTS IN HEIGHT DIRECTION (3) DETECTION BY RADAR HAVING RESOLUTION IN HEIGHT DIRECTION (IN CASE OF SHORT DISTANCE)

⇒ SINCE DISTANCE IS TOO SHORT, MANY REFLECTION POINTS IN HEIGHT DIRECTION CANNOT BE OBTAINED

⇒ ALTHOUGH RADAR IS IMAGING RADAR, IT IS DIFFICULT TO PERFORM TARGET IDENTIFICATION AT SHORT DISTANCE

HOST VEHICLE BLIND SPOT MONITORING SYSTEM AND HOST VEHICLE BLIND SPOT MONITORING METHOD

TECHNICAL FIELD

The present embodiment relates to a host vehicle blind spot monitoring system and a host vehicle blind spot monitoring method for detecting a weak traffic person such as a pedestrian and a cyclist in a front blind spot and a side blind spot of a large commercial vehicle.

BACKGROUND ART

Various systems for ensuring safety of drivers, pedestrians, and the like, such as an inter-vehicle distance warning system and a collision damage reduction brake system, are mounted on recent vehicles.

An in-vehicle millimeter-wave radar is one of sensors that search a vehicle peripheral situation in real time in the above safety ensuring system. The in-vehicle millimeter-wave radar estimates target information such as a distance to a target, a speed of the target, an angle of the target, and a reflection intensity at the target by emitting radio waves (millimeter waves) to a space around the vehicle and performing signal processing on a reflection wave bouncing back from a surrounding target (a preceding vehicle, a weak traffic person such as a pedestrian or a cyclist, an obstacle such as a guardrail or a utility pole, and the like).

Here, there is PTL 1 as a known document that discloses a radar mounted vehicle. The abstract in PTL 1 discloses, as a problem, "an azimuth related to traveling of a host vehicle and a ground vehicle speed are accurately detected, and an approach to an object is reliably avoided", and discloses, as a solution to problem, that "a stationary object is identified by using a plurality of side monitoring radar devices 21 and 22. Objects that exist in a spatially dense manner are determined as stationary objects RM1 and RM2 based on detection values of azimuths and relative speeds of the stationary objects RM1 and RM2. A probability of an approach to the object T11 or T21 is determined based on information of azimuths and relative speeds for the objects T11 and T21 located closest to the host vehicle among objects (reflection points) forming the determined stationary objects, and a signal for reducing the probability is supplied to a vehicle control device 50".

CITATION LIST

Patent Literature

PTL 1: JP 2010-43960 A

SUMMARY OF INVENTION

Technical Problem

In a large commercial vehicle (a large truck or the like) in which a seat position of a driver is high, as illustrated in FIG. 1, the eye line of the driver is high. Thus, the proximity blind spot area in front of the host vehicle tends to be large. In addition, generally, the vehicle length is long, so that the proximity blind spot area on the side of the host vehicle tends to be large.

In order to suppress a contact accident with a weak traffic person such as a pedestrian or a cyclist in a host vehicle blind spot area at the start of such a large commercial vehicle, the regulation (URN 159) that demands detection, alarm, and the like of a weak traffic person (pedestrian, cyclist) in a front blind spot area and the regulation (URN 151) that demands detection, alarm, and the like of a weak traffic person (cyclist) in a side blind spot area are established, and installation of a system for observing these regulations is required for a large commercial vehicle of 3.5 t or more.

A vehicle movement situation detection device in PTL 1 described above is assumed to be mounted on a so-called ordinary vehicle (see FIG. 1 and the like of PTL 1), and is not assumed to be mounted on a large commercial vehicle having a greatly different vehicle body shape. In addition, the device is intended to detect a stationary object, and does not assume detection of a moving object such as a pedestrian or a cyclist. That is, PTL 1 does not specifically disclose a system that detects a weak traffic person in a host vehicle blind spot area and issues an alarm, which is scheduled to be mounted on a large commercial vehicle.

Therefore, an object of the present invention is to provide a host vehicle blind spot monitoring system and a host vehicle blind spot monitoring method for, in a large commercial vehicle having a high seat position of a driver, identifying a type of target in a host vehicle blind spot area, and, when the target is a weak traffic person such as a pedestrian or a cyclist, issuing an alarm to the driver or performing vehicle control for avoiding a contact accident, such as automatic braking or automatic steering.

Solution to Problem

In order to solve the above problems, according to the present invention, a host vehicle blind spot monitoring system transmits a transmission wave to a predetermined search area and identifies a type of an object that reflects the transmission wave, based on detection results of a plurality of radar devices that detect the object by using a reflected wave received from the object. The plurality of radar devices is arranged such that a search area of each of the radar devices has a different vertical height from a road surface. The host vehicle blind spot monitoring system includes an identification processing unit that acquires a detection point at which the object has been detected for each search area and distance information from the radar device to the detection point, and identifies the type of the object based on the distance information and a size of a detection area configured by the detection point.

Advantageous Effects of Invention

According to the host vehicle blind spot monitoring system and the host vehicle blind spot monitoring method of the present invention, in a large commercial vehicle having a high seat position of a driver, it is possible to identify a type of target in a host vehicle blind spot area, and, when the target is a weak traffic person such as a pedestrian or a cyclist, issue an alarm to the driver or perform vehicle control for avoiding a contact accident, such as automatic braking or automatic steering.

BRIEF DESCRIPTION OF DRAWINGS

FIG. 5 is an explanatory diagram of a target identifying method by a host vehicle blind spot monitoring system in Embodiment 1.

FIG. 8 is an explanatory diagram of a target identifying method by a host vehicle blind spot monitoring system in Embodiment 2.

FIG. 10 is an explanatory diagram of a target identifying method by a host vehicle blind spot monitoring system according to Embodiment 3.

DESCRIPTION OF EMBODIMENTS

Hereinafter, a host vehicle blind spot monitoring system according to embodiments of the present invention will be described in detail with reference to the drawings.

Embodiment 1

First, a host vehicle blind spot monitoring system 100 according to Embodiment 1 of the present invention will be described in detail with reference to FIGS. 2 to 6. An object of the host vehicle blind spot monitoring system 100 is to comply with the regulation (UNR 159) for protecting a weak traffic person (pedestrian P, cyclist C) in a front blind spot area of a large commercial vehicle.

<Outline of Host Vehicle $V_0$ and Host Vehicle Blind Spot Monitoring System 100>

In the present embodiment, a host vehicle $V_0$ is a large commercial vehicle having a high seat position of a driver, and is, for example, a large freight vehicle such as a truck or a dump truck, or a large passenger transport vehicle such as a bus. An example in which the host vehicle $V_0$ is a truck will be described below.

Figure 1:
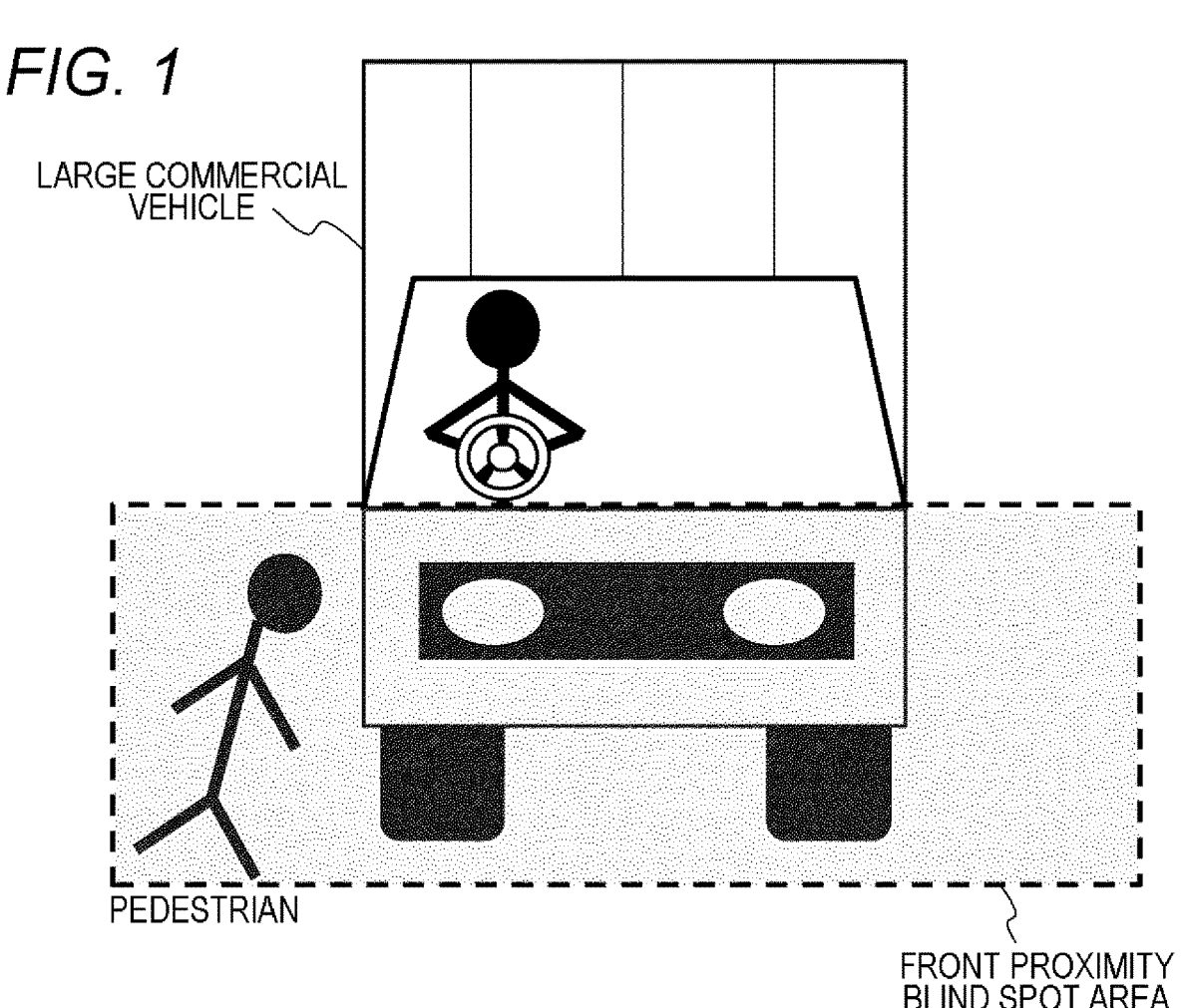
FIG. 1 is an image view of a blind spot area in the vicinity of a large commercial vehicle.
Figure 2:
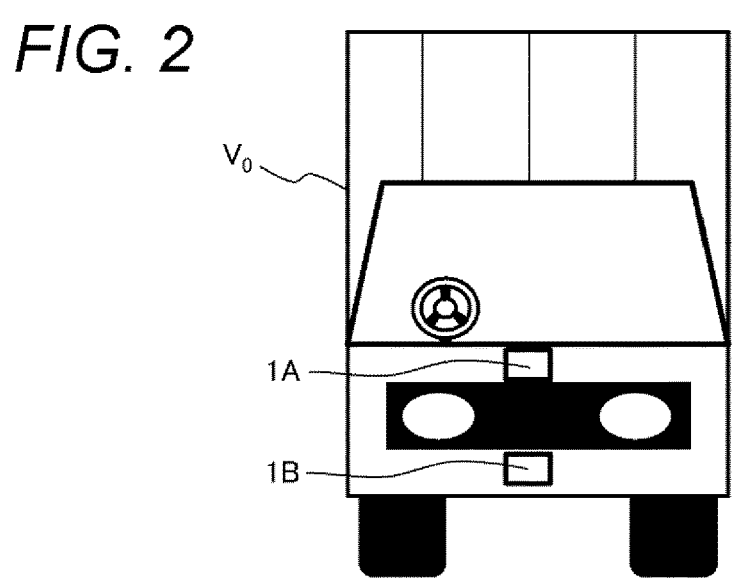
FIG. 2 is an explanatory diagram of an installation position of a radar device according to Embodiment 1.

As illustrated in FIG. 2, in the present embodiment, in order to detect a weak traffic person in a front blind spot area, in the host vehicle $V_0$, a radar device 1A is installed at a high position (for example, a position with a height of 1.5 m) on the front surface of the host vehicle $V_0$, and a radar device 1B is installed at a low position (for example, a position with a height of 0.5 m) on the front surface of the host vehicle $V_0$. Note that, in FIG. 2, monitoring directions of the radar devices 1A and 1B having the same specifications substantially coincide with each other by arranging the radar devices 1A and 1B in the substantially vertical direction. As long as the monitoring directions of the radar devices overlap each other to some extent or more, the radar devices 1A and 1B may be arranged with lateral positions shifted, or the specifications of the visual field ranges of the radar devices 1A and 1B may be made different.

The host vehicle blind spot monitoring system 100 mounted on the host vehicle $V_0$ is a system that uses radar devices 1A and 1B arranged above and below to identify the type of target in a front blind spot area and to, when the target is a weak traffic person, issue an alarm to a driver or perform vehicle control for avoiding a contact accident, such as automatic braking or automatic steering. The host vehicle blind d spot monitoring system 100 includes an electronic control unit (referred to as an "ECU 2" below), a controller area network bus (referred to as a "CAN bus 3" below), a user interface 4, and a vehicle control device 5 in addition to the above radar device 1 (1A, 1B). Details of each component will be sequentially described below.

<Radar Device 1>

In the present embodiment, the radar device 1 (1A, 1B) is an in-vehicle millimeter wave radar that emits radio waves (transmission waves) to a search area in front of a host vehicle, performs signal processing on a reflected wave bouncing back from a target (a preceding vehicle, a weak traffic person such as a pedestrian or a cyclist, an obstacle such as a guardrail or a utility pole, and the like) in the search area, thereby estimating target information D for each target, such as a distance to the target, a speed of the target, an angle of the target, and a reflection intensity at the target, and outputs the estimated target information D to the ECU 2.

Figure 3:
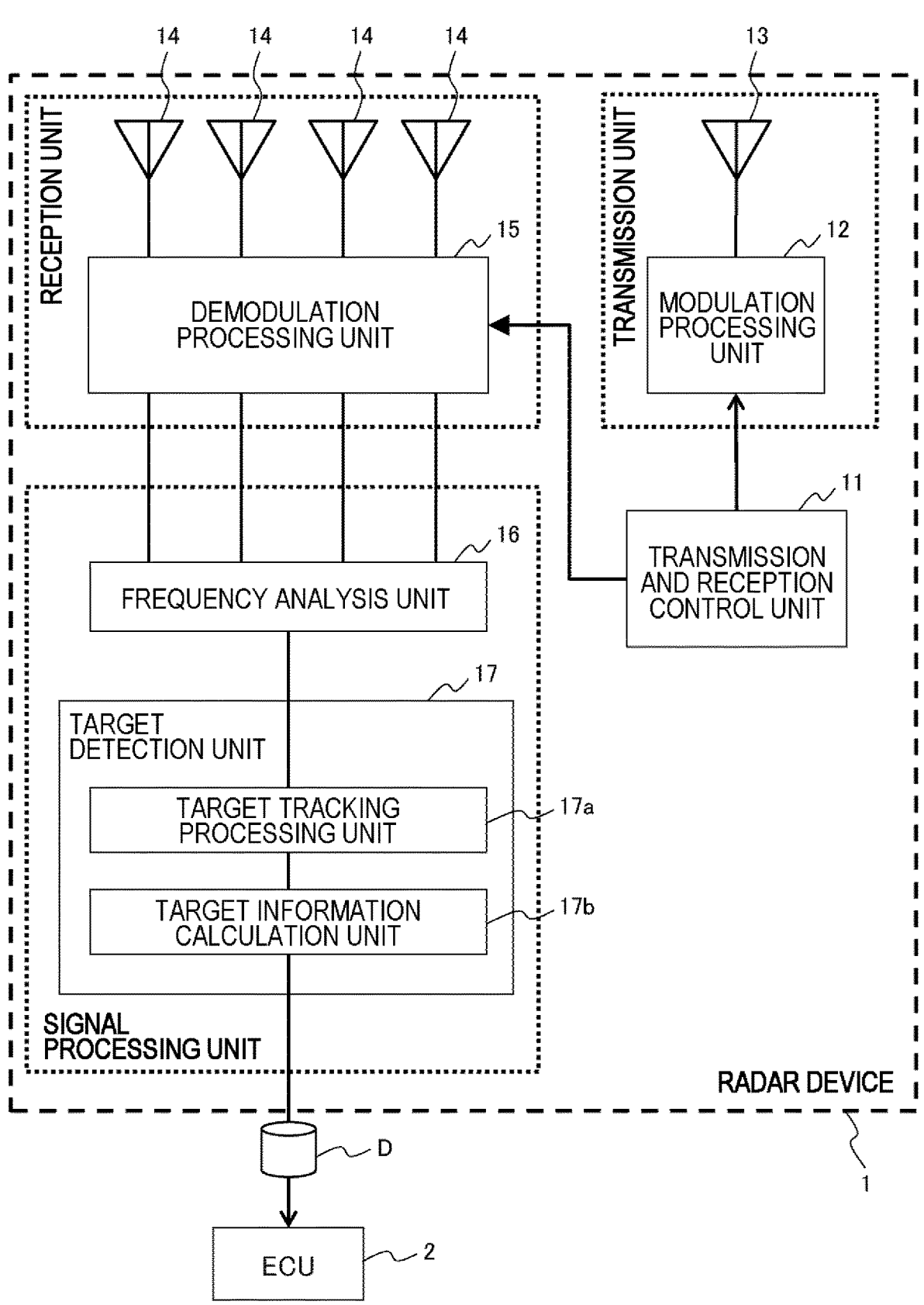
FIG. 3 is a functional block diagram of the radar device in Embodiment 1.

As illustrated in FIG. 3, the radar device 1 includes a transmission and reception control unit 11, a transmission unit (modulation processing unit 12, transmission antenna 13), a reception unit (reception antenna 14, modulation processing unit 15), and a signal processing unit (frequency analysis unit 16, target detection unit 17). In addition, the target detection unit 17 includes a target tracking processing unit 17a and a target information calculation unit 17b.

In the radar device 1, first, the transmission and reception control unit 11 determines an emission timing of radio waves, and commands the modulation processing unit 12 to emit the radio waves. The modulation processing unit 12 that has received the command increases a carrier frequency of the radio wave subjected to phase modulation or frequency modulation according to the type to a specific frequency band such as a 77 GHz band, and then emits the radio waves to a space in front of the host vehicle $V_0$ via the transmission antenna 13.

When there is any target in a radio wave emission direction (in front of the host vehicle), the reception antenna 14 receives the radio wave reflected from the target, and the demodulation processing unit 15 lowers the frequency band of the received radio wave to the frequency band of the baseband signal that can be analyzed by signal processing, by using the transmission radio wave, and converts the radio wave into digital data through a signal amplifier, filter processing, and AD conversion.

Then, the converted digital data is input to the frequency analysis unit 16. Threshold processing is performed based on the frequency spectrum after Fourier transform in a distance direction, a speed direction, and an angle direction to extract data points to be transferred to the target detection unit 17 in the subsequent stage. In the target detection unit 17, first, the target tracking processing unit 17a performs filter processing in a time-series direction while using target information of the past time point. The target information calculation unit 17b estimates and outputs target information D based on the processed data. Note that the output of the upper radar device 1A is referred to as target information $D_A$ below, and the output of the lower radar device 1B is referred to as target information $D_B$ below.

<CAN Bus 3>

The CAN bus 3 is a bus that communicably connects various devices in the host vehicle $V_0$ to each other. Specifically, the CAN bus 3 communicably connects the radar device 1 and the ECU 2 to each other, communicably connects the ECU 2 and the user interface 4 to each other, and communicably connects the ECU 2 and the vehicle control device 5 to each other.

<User Interface 4>

The user interface 4 is an interface for alarming the driver to the presence of a weak traffic person when there is the weak traffic person in the proximity blind spot area of the host vehicle $V_0$. Specifically, the user interface 4 is a display, a lamp, or the like for visually alarming the driver to the presence of the weak traffic person, or a speaker or the like for audibly alarming the driver to the presence of the weak traffic person.

<Vehicle Control Device 5>

The vehicle control device 5 is a control device that controls a braking system, a steering system, and the like of the host vehicle $V_0$. When there is a weak traffic person in the proximity blind spot area of the host vehicle $V_0$, the vehicle control device 5 automatically brakes the host vehicle $V_0$ to make the host vehicle $V_0$ emergency stop before coming into contact with the weak traffic person, or automatically steers the host vehicle $V_0$ to avoid the weak traffic person. Note that, although not illustrated, speed information and steering information of the host vehicle $V_0$ are input from the vehicle control unit 5 to the ECU 2, so that the ECU 2 can grasp a host vehicle speed and a host vehicle traveling direction.

<ECU 2>

Figure 4:
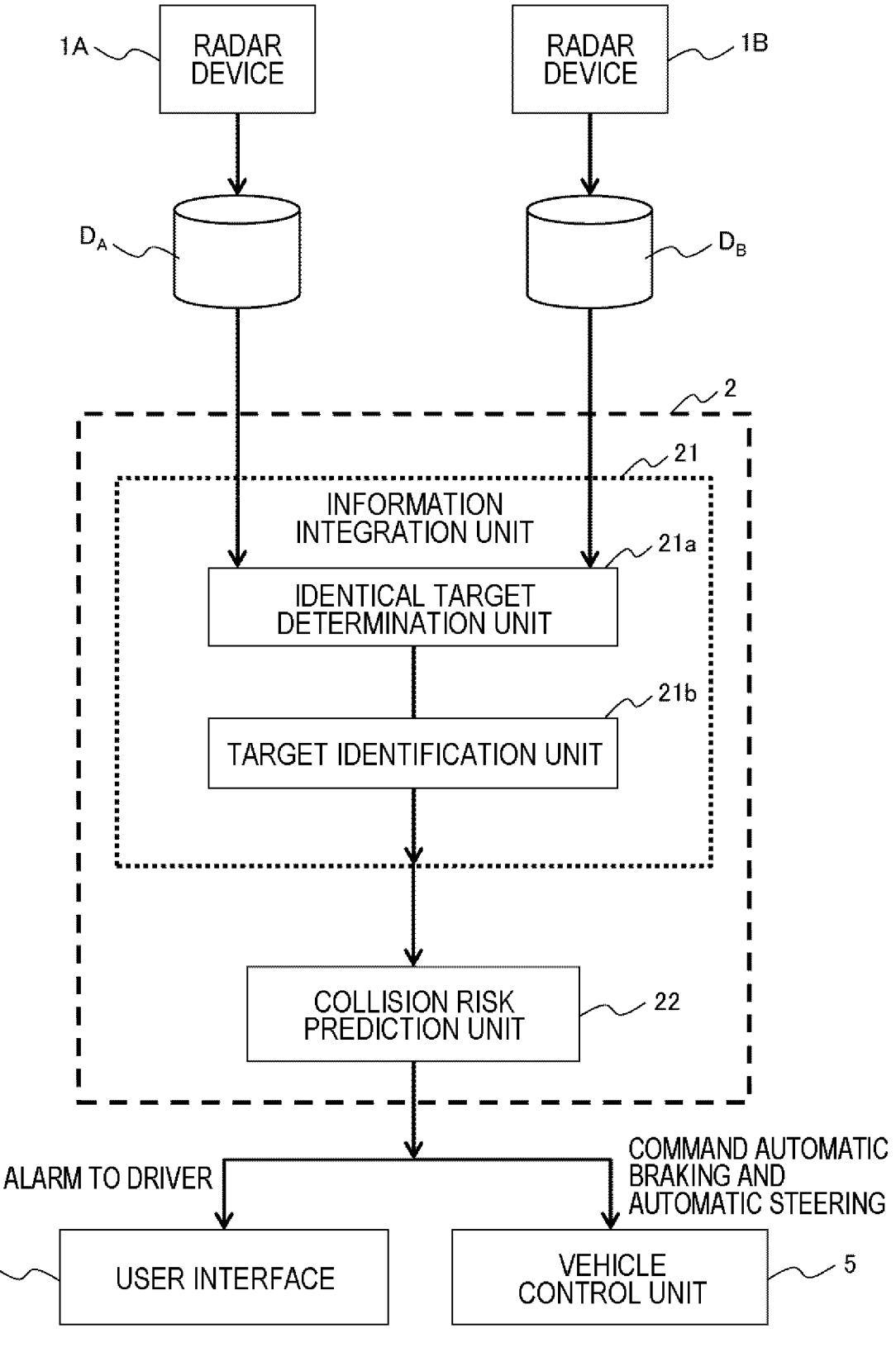
FIG. 4 is a functional block of an ECU in Embodiment 1.

Next, details of the ECU 2 in the present embodiment, that processes target information $D_A$ and $D_B$ from the radar devices 1A and 1B will be described with reference to FIG. 4. Note that the ECU 2 is specifically a computer including an arithmetic device such as a CPU, a storage device such as a semiconductor memory, and hardware such as a communication device. The arithmetic device executes a predetermined program to implement each function to be described later. Details of each unit of the ECU 2 will be described below while appropriately omitting such a well-known technique in the computer field.

First, after integrating the target information $D_A$ and $D_B$, an information integration unit 21 identifies a target type based on the integration information, and transmits an identification result to a collision risk prediction unit 22. Details of target identification processing in the information integration unit 21 will be described later.

The collision risk prediction unit 22 predicts a collision with a target based on output information (position, speed, and type of target in front of the host vehicle) of the information integration unit 21, and predicts a risk of collision. When the target is a weak traffic person and the risk of collision is low, the risk of collision with the weak traffic person is alarmed to the driver via the user interface 4. As a result, the driver can perform a vehicle operation for avoiding a contact with a weak traffic person. On the other hand, when the target is a weak traffic person and the risk of collision is high, a command is transmitted to the vehicle control device 5 to cause the host vehicle $V_0$ to make an emergency stop by automatic braking or to avoid the weak traffic person by automatic steering.

<Details of Processing in Information Integration Unit 21>

As described above, the information integration unit 21 identifies the target type by using the target information $D_A$ and $D_B$, which are the outputs of the radar devices 1A and 1B installed at different heights on the front surface of the host vehicle $V_0$. A principle of identifying the target type will be described below by using the target information $D_A$ and $D_B$ in combination.

As illustrated in FIG. 2, the two radar devices 1A and 1B have different attachment heights. Thus, when the target in front of the host vehicle is a target extending in a height direction, the radar devices 1A and 1B receive reflected waves from different parts of the target.

FIG. 5 is a diagram illustrating target information $D_A$ and $D_B$ from the radar devices 1A and 1B when the target in front of the host vehicle is (1) a pedestrian P, (2) a cyclist C, and (3) a preceding vehicle $V_1$.

For example, as illustrated in (2) of FIG. 5, when the target in front of the host vehicle is the cyclist C, the radar device 1A on the upper side detects the back surface (such as the back) of the cyclist C (in FIG. 5, the detection point of the radar device 1A is illustrated by a circle), and the radar device 1B on the lower side detects the rear end (such as the tire) of a bicycle (in FIG. 5, the detection point of the radar device 1B is illustrated by a cross mark). In this case, comparing the target information $D_A$ and $D_B$ from both radar devices, the reflection intensity of the radar device 1A that detects a human has a characteristic of being relatively smaller than the reflection intensity of the radar device 1B that detects metal, rubber, or the like. In addition, comparing the distances in a depth direction (the traveling direction of the host vehicle $V_0$), the detection distance of the radar device 1A that detects the back surface of the cyclist C has a characteristic of being longer than the detection distance of the radar device 1B that detects the rear end of the bicycle.

Thus, when the relative relationship indicated by the target information $D_A$ and $D_B$ has a large depth difference (specifically, the detection distance of the radar device 1A is longer than the detection distance of the radar device 1B by about 70 cm or more corresponding to the length of the rear wheel tire of the bicycle) and a reflection intensity difference is large (specifically, a difference in reflection intensity between the radar device 1A and the radar device 1B is about 5 dB or more corresponding to a difference in size (RCS, Rader Cross Section) of the detection area between a person and a bicycle), the target type can be identified as the cyclist C.

On the other hand, as illustrated in (1) and (3) of FIG. 5, when the target in front of the host vehicle is the pedestrian P or the preceding vehicle $V_1$, if the relative relationship between the target information $D_A$ and $D_B$ is such that the depth difference is 10 cm or less, which is the radar resolution, or the reflection intensity difference is −2 dB or less, it may be difficult to identify the pedestrian P and the preceding vehicle $V_1$ from the relative difference in depth and reflection intensity. Therefore, in the present embodiment, the pedestrian P and the preceding vehicle $V_1$ are identified by considering the absolute value of the reflection intensity in addition to the depth difference and the reflection intensity. Specifically, since the absolute value of the RCS value is usually about-5 dB for the pedestrian P having a small area visible from the host vehicle $V_0$, and the absolute value of the RCS value is usually about 10 dB for the preceding vehicle $V_1$ having a large area visible from the host vehicle $V_0$, the pedestrian P and the preceding vehicle $V_1$ can be clearly distinguished by using the absolute value of the RCS value.

<Processing Flow of Information Integration Unit 21>

Figure 6:
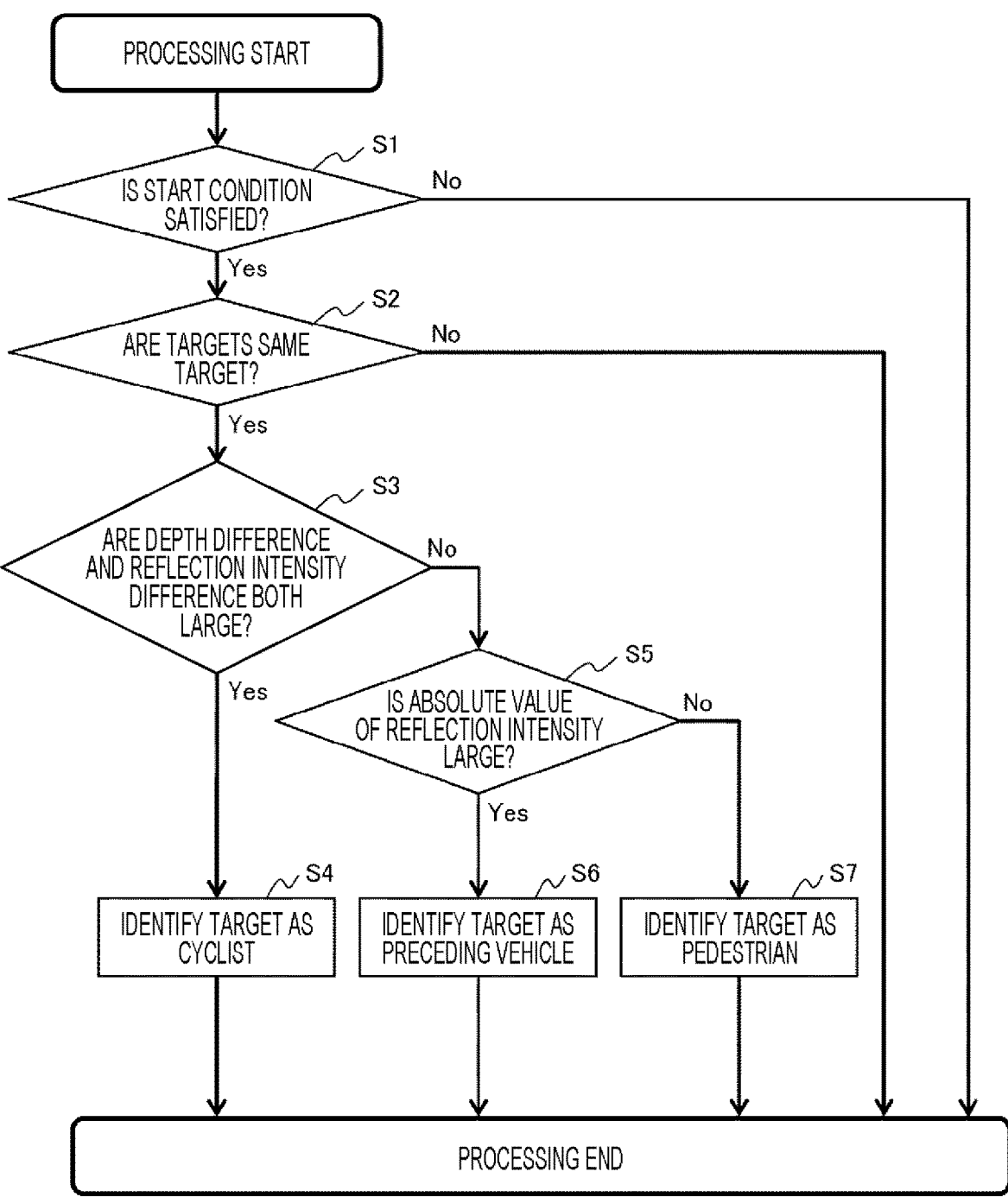
FIG. 6 is a flowchart of target identification processing by the host vehicle blind spot monitoring system in Embodiment 1.

Next, details of the target identification processing in the information integration unit 21 in the present embodiment will be described with reference to the flowchart of FIG. 6 using the identification principle of target type described with reference to FIG. 5.

First, in Step S1, the information integration unit 21 determines whether a start condition (Conditions 1 to 3) of the target identification processing described below is satisfied. When the condition is satisfied, the process proceeds to Step S2, and if not, the process ends. Note that the purpose of the present embodiment is to comply with the UNR 159 (protection of weak traffic persons in a front blind spot when the host vehicle starts), and thus the following conditions are conditions defined by the UNR 159.

(Condition 1) The target exists at a short distance (traveling direction: within a range of 0.8 m to 3.7 m, lateral direction: within a range of 0.5 m from the side surface of the host vehicle) from the host vehicle $V_0$.

(Condition 2) The target speed is 0 km/h to 10 km/h.

(Condition 3) The host vehicle $V_0$ travels straight and has a speed of 10 km/h or less.

In Step S2, an identical target determination unit 21a determines whether or not targets detected by the respective radar devices are the identical target. The process proceeds to Step S3 when the targets are the identical target, otherwise the process ends.

Specifically, the determination in this step is to evaluate whether the following (Formula 1) and (Formula 2) are satisfied based on the position and speed information of the target detected by each radar device.

[Mathematica Formula 1]

$$\sqrt{(X_A - X_B)^2 + (Y_A - Y_B)^2} < R_{Th} \quad \text{(Formula 1)}$$

[Mathematica Formula 2]

$$\sqrt{(VX_A - VX_B)^2 + (VY_A - VY_B)^2} < R_{Th} \quad \text{(Formula 2)}$$

Note that, in (Formula 1) and (Formula 2), X and Y represent the target detection position of each radar device when the center of the front surface of the host vehicle $V_0$ is set to an origin, the front-rear direction of the host vehicle $V_0$ is set to an X axis (the front direction is positive), and the left-right direction is set to a Y axis (the left direction is positive). The target detection positions by the radar device 1A are denoted by $X_A$ and $Y_A$, and the target detection positions by the radar device 1B are denoted by $X_B$ and $Y_B$. In addition, VX and VY represent an X-direction component and a Y-direction component of the target speed. The target speed by the radar device 1A is denoted by $VX_A$ and $VY_A$, and the target speed by the radar device 1B is denoted by $VX_B$ and $VY_B$.

With both formulas, the distances between the detection points of the respective radar devices and the magnitudes of the speeds are evaluated based on threshold values $R_{TH}$ and $V_{TH}$. When the left sides of both the formulas are less than the threshold value of the right side, the targets detected by the respective radar devices are regarded as the identical target. Note that $R_{TH}$ is set to, for example, the length of a bicycle of 1.9 m, and $V_{Th}$ is set to, for example, the speed resolution of the radar of 1.8 km/h.

In Step S3, the target identification unit 21b evaluates a difference in depth of the target detected by the respective radar devices and a difference in reflection intensity. When both the differences are large, the process proceeds to Step S4, and otherwise, the process proceeds to Step S5. Note that, since Step S3 is a process of determining whether or not the target is a cyclist C, the phrase "difference in depth is large" in Step S3 indicates that there is a distance difference of about 70 cm or more corresponding to the length of the rear wheel tire of the bicycle. The phrase "difference in reflection intensity is large" indicates that there is a difference in reflection intensity of about 5 dB or more, which is an RCS difference between a person and the bicycle.

In Step S4, the target identification unit 21b identifies the target in front of the host vehicle as the cyclist C.

In Step S5, the target identification unit 21b evaluates the absolute value of the reflection intensity. When the absolute value is large (when the RCS value is equivalent to an automobile (about 10 dB)), the process proceeds to Step S6, and the target in front of the host vehicle is identified as the preceding vehicle $V_1$. On the other hand, when the absolute value is not large (when the RCS value is equivalent to a pedestrian (about −5 dB)), the process proceeds to Step S7, and the target in front of the host vehicle is identified as the pedestrian P. Note that, in FIG. 5, the phrase "depth difference=small" indicates, for example, a distance difference of 10 cm or less in radar distance resolution. The phrase "reflection intensity difference=small" indicates, for example, that the reflection intensity difference is −1 dB or less.

After the above processing is performed, information (position, speed, and target type) of each target is transmitted to the collision risk prediction unit 22 in the subsequent stage. Thereafter, the collision risk prediction unit 22 generates a command corresponding to the target type and the magnitude of the collision risk, and transmits the command to the user interface 4 and the vehicle control device 5.

Effects of Present Embodiment

As described above, according to the host vehicle blind spot monitoring system of the present embodiment, in a large commercial vehicle having a high seat position of a driver, it is possible to identify a type of target in a blind spot area in front of a host vehicle, and, when the target is a weak traffic person such as a pedestrian or a cyclist, issue an alarm to the driver or perform vehicle control for avoiding a contact accident, such as automatic braking or automatic steering.

Embodiment 2

Figure 9:
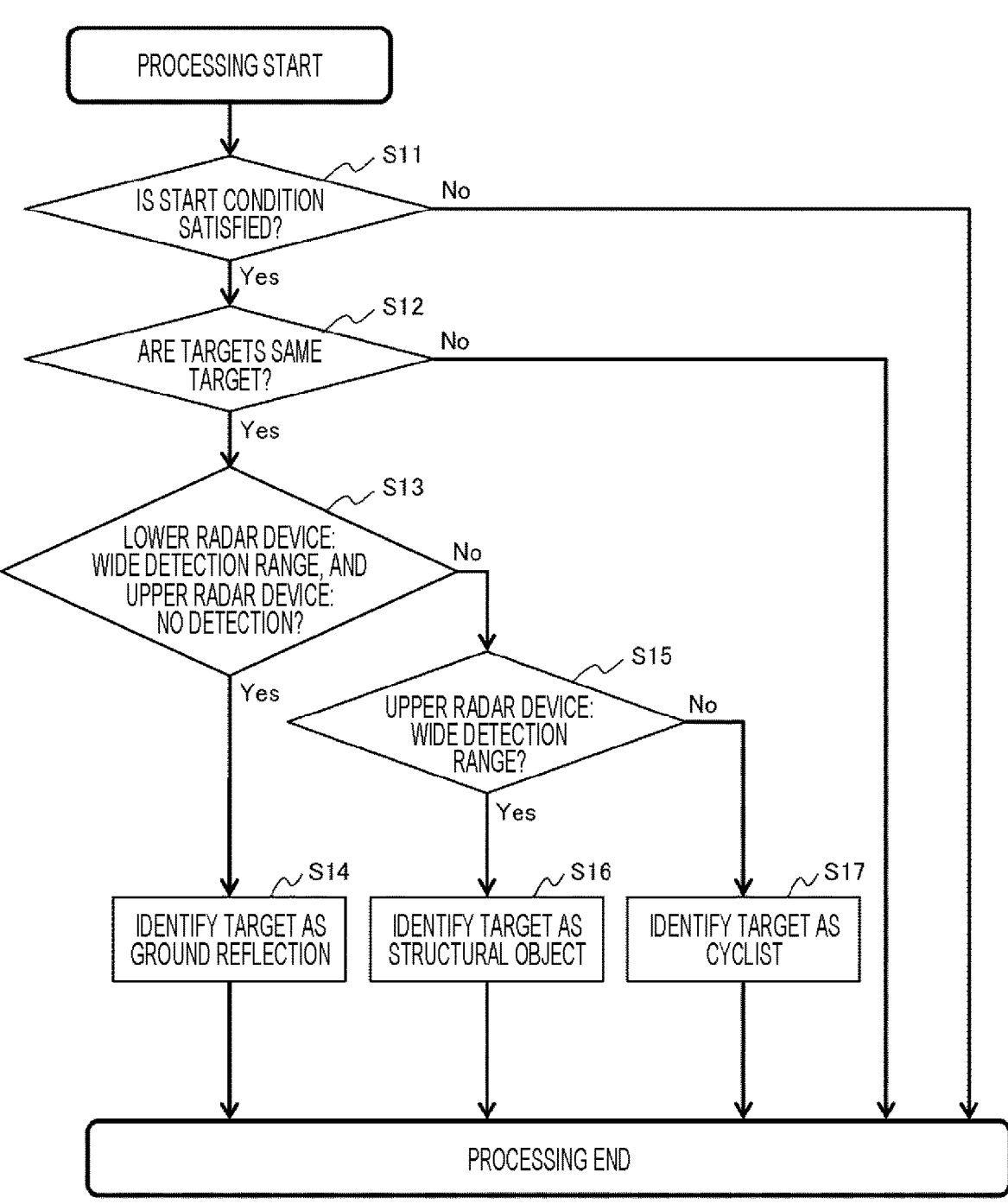
FIG. 9 is a flowchart of target identification processing by the host vehicle blind spot monitoring system in Embodiment 2.

First, a host vehicle blind spot monitoring system 100 according to Embodiment 2 of the present invention will be described in detail with reference to FIGS. 7 to 9. An object of the host vehicle blind spot monitoring system 100 is to comply with the regulation (UNR 151) for protecting a weak traffic person (cyclist C) in a front blind spot area of a large commercial vehicle. Note that repetitive descriptions of points common to Embodiment 1 will be omitted.

In Embodiment 1, a method of identifying a target in a front blind spot area of the host vehicle using the radar device 1A on the upper side of the front surface and the radar device 1B on the lower side of the front surface has been described. On the other hand, in the present embodiment, a method of identifying a target in a side blind spot area of the host vehicle by using the radar device 1A on the upper side and the radar device 1B on the lower side will be described. Note that, from the viewpoint of using a difference in detection information between a pair of radar devices different attachment heights, the basic processing contents of the target identification method in Embodiment 1 and the target identification method in the present embodiment are similar.

Figure 7:
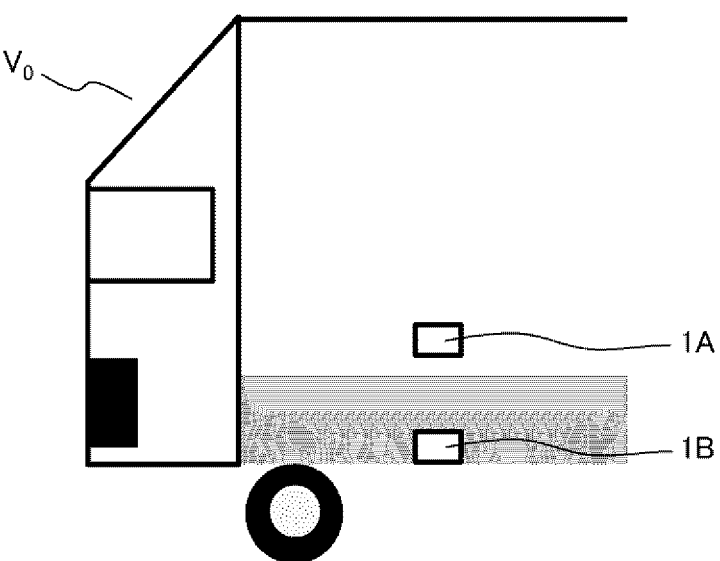
FIG. 7 is an explanatory diagram of an installation position of a radar device according to Embodiment 2.

As illustrated in FIG. 7, in the present embodiment, in order to detect a weak traffic person (cyclist C) in a side blind spot area, in the host vehicle $V_0$, a radar device 1A is installed at a high position (for example, a position with a height of 1.0 m) on the side surface of the host vehicle $V_0$, and a radar device 1B is installed at a low position (for example, a position with a height of 0.4 m) on the front surface of the host vehicle $V_0$.

When the side blind spot area of the host vehicle $V_0$ is sensed by both the radar devices, a detection result that is spread in the front-rear direction is obtained from a target having a size in the traveling direction of the host vehicle $V_0$, such as a cyclist C, a wall, or a guardrail. In the present embodiment, the lower radar device 1B is installed under the bodywork of a commercial vehicle, and target sensing is performed at a position lower than the lower radar device 1B in Embodiment 1. Therefore, when there is no target on the side of the host vehicle, there is a high probability of picking up ground reflection.

Therefore, in the present embodiment, target information $D_A$ and $D_B$ of the two radar devices 1A and 1B having different mounting heights as described above are compared with each other, and the target type is identified by the principle of FIG. 8.

FIG. 8 is a diagram illustrating the target information $D_A$ and $D_B$ from the radar devices 1A and 1B when the target on the side of the host vehicle is (1) a cyclist C, (2) a structural object such as a wall or a guardrail, and (3) only the ground.

For example, as illustrated in (1) of FIG. 8, when the target on the side of the host vehicle is the cyclist C, the radar device 1A on the upper side detects only the upper body of the cyclist C. Thus, the detection range is small (for example, the longitudinal length is 70 cm or less), but the radar device 1B on the lower side detects the entire bicycle, and thus the detection range is large (for example, the longitudinal length is 190 cm or more).

On the other hand, when the target on the side of the host vehicle is a structural object such as a wall or a guardrail as illustrated in (2) of FIG. 8, both the upper radar device 1A and the lower radar device 1B have a large detection range. When only the ground exists on the side of the host vehicle as illustrated in (3) of FIG. 8, the upper radar device 1A detects nothing. As described above, it is possible to identify the target type on the side of the host vehicle by a combination of the sizes of the detection ranges of the upper and lower radar devices 1.

<Processing Flow of Information Integration Unit 21>

Next, details of the target identification processing in the information integration unit 21 in the present embodiment will be described with reference to the flowchart of FIG. 9 using the identification principle of target type described with reference to FIG. 8.

First, in Step S11, the information integration unit 21 determines whether a start condition (Conditions 1 to 3) of the target identification processing described below is satisfied. When the condition is satisfied, the process proceeds to Step S12, and if not, the process ends. Note that the purpose of the present embodiment is to comply with the UNR 151 (protection of a cyclist in a side blind spot when the host vehicle starts), and thus the following conditions are conditions defined by the UNR 151.

(Condition 1) A target exists within a range of 0.9 m to 4.25 m from the side surface of the host vehicle $V_0$.

(Condition 2) The target speed is 0 km/h to 20 km/h.

(Condition 3) The host vehicle $V_0$ travels straight and has a speed of 0 km/h to 30 km/h.

In Step S12, an identical target determination unit 21a determines whether or not targets detected by the respective radar devices are the identical target. The process proceeds to Step S13 when the targets are the identical target, otherwise the process ends.

In Step S13, the target identification unit 21b evaluates the detection spread of the target detected by each radar device.

When the detection spread of the radar device 1B on the lower side is large and the radar device 1A on the upper side detects nothing, the process proceeds to Step S14, and the target is identified as ground reflection (no target). On the other hand, if not, the process proceeds to Step S15.

In Step S15, the target identification unit 21b evaluates the detection spread of the radar device 1A on the upper side. When the detection spread is large, the process proceeds to Step S16, and the target is identified as a structural object. When the detection spread is small, the process proceeds to Step S17, and the target is identified as a cyclist C. Here, the sentence "the detection spread is small" indicates the size of the cyclist C of about 60 cm, and the sentence "the detection spread is large" indicates that the size of the bicycle is larger than about 1.9 m.

Effects of Present Embodiment

As described above, according to the host vehicle blind spot monitoring system of the present embodiment, in a large commercial vehicle having a high seat position of a driver, it is possible to identify a type of target in a blind spot area on the side of the host vehicle, and, when the target is a cyclist, issue an alarm to the driver or perform vehicle control for avoiding a contact accident, such as automatic braking or automatic steering.

Embodiment 3

Next, a host vehicle blind spot monitoring system 100 according to Embodiment 3 of the present invention will be described in detail with reference to FIG. 10. Note that repetitive descriptions of points common to the above embodiments will be omitted.

FIG. 10 illustrates conceptual diagrams of detection points for a cyclist C when the radar device 1 in Embodiment 1 having no resolution in the height direction is used and when the radar device (referred to as an imaging radar 10) in the present embodiment having resolution in the height direction is used.

In (1) of FIG. 10, even if the radar device 1 does not have the resolution in the height direction, the integration of the detection information of the two radar devices 1A and 1B has an effect equivalent to two-point sampling in the height direction of the target, so that it is possible to substantially have the resolution in the height direction.

On the other hand, in (2) of FIG. 10, when the upper and lower imaging radars 10A and 10B are used, it can be seen that the number of sampling points in the height direction increases as compared with (1) of FIG. 10 because the imaging radars have resolution in the height direction. Therefore, in the present embodiment in which the imaging radar 10 is adopted, it is expected that the identification accuracy for each target is improved by an increase in the number of detection points in the height direction.

(3) of FIG. 10 assumes a test case of UNR 159, in which the imaging radar 10 is adopted and the distance from the target is short (0.9 m to 3.7 m). In this case, since the distance is too short, the detection point in the height direction of the target cannot be obtained only by one imaging radar 10. Therefore, it is difficult to perform target identification by the imaging radar alone, but it is possible to perform accurate target identification by using the outputs of both imaging radars 10 in combination.

As described above, according to the host vehicle blind spot monitoring system of the present embodiment in which the radar devices 1 in Embodiments 1 and 2 are replaced with the imaging radars 10, it is possible to more accurately identify the target type as compared with the host vehicle blind spot monitoring system in Embodiments 1 and 2.

REFERENCE SIGNS LIST

100 host vehicle blind spot monitoring system
1, 1A, 1B radar device
11 transmission and reception control unit
12 modulation processing unit
13 transmission antenna
14 reception antenna
15 demodulation processing unit
16 frequency analysis unit
17 target detection unit
17a target tracking processing unit
17b target information calculation unit
10, 10A, 10B imaging radar
2 ECU
21 information integration unit
21a identical target determination unit
21b target identification unit
22 collision risk prediction unit
3 CAN bus
4 user interface
5 vehicle control device
D target information
$V_0$ host vehicle
$V_1$ preceding vehicle
P pedestrian
C cyclist

The invention claimed is:

1. A host vehicle blind spot monitoring system that transmits a transmission wave to a predetermined search area and identifies a type of an object that reflects the transmission wave, based on detection results of a plurality of radar devices that detect the object by using a reflected wave received from the object, wherein:

the plurality of radar devices are arranged such that a search area of each of the radar devices has a different vertical height from a road surface, and the host vehicle blind spot monitoring system includes an engine control unit configured to:

acquire a detection point, at which the object has been detected for each search area, and distance information from the radar device to the detection point, identify the type of the object based on the distance information and a size of a detection area configured by the detection point, identify the object based on presence or absence of the detection area for each search area and a horizontal length of the detection area, identify the type of the object as a cyclist when a detection area of an upper radar device disposed on a side surface of a host vehicle has a small spread in a horizontal direction and a detection area of a lower radar device disposed on the side surface of the host vehicle has a large spread in the horizontal direction, identify the type of the object as a structural object when the detection area of the upper radar device has a large spread in the horizontal direction and the detection area of the lower radar device has a large spread in the horizontal direction, and identify that there is no object when there is no detection area of the upper radar device and the detection area of the lower radar device has a large spread in the horizontal direction.

2. A host vehicle blind spot monitoring system that transmits a transmission wave to a predetermined search area and identifies a type of an object that reflects the transmission wave, based on detection results of a plurality of radar devices that detect the object by using a reflected wave received from the object, wherein:

the plurality of radar devices are arranged such that a search area of each of the radar devices has a different vertical height from a road surface, and the host vehicle blind spot monitoring system includes an engine control unit configured to:

acquire a detection point, at which the object has been detected for each search area, and distance information from the radar device to the detection point, identify the type of the object based on the distance information and a size of a detection area configured by the detection point, identify the object based on presence or absence of the detection area for each search area and a horizontal length of the detection area, and start object identification processing when Conditions 1 to 3 are satisfied:

(Condition 1) an object exists within a range of 0.9 m to 4.25 m from a side surface of the host vehicle;

(Condition 2) an object speed is 0 km/h to 20 km/h; and (Condition 3) the host vehicle travels straight and has a speed of 0 km/h to 30 km/h.

3. The host vehicle blind spot monitoring system according to claim 2, wherein the engine control unit is further configured to obtain a depth length of the object from the distance information, and identify the object based on the depth length for each search area.

4. The host vehicle blind spot monitoring system according to claim 3, wherein the engine control unit is further configured to acquire a reflection intensity of the detection point and identify the object based on the reflection intensity for each search area.

5. A host vehicle blind spot monitoring system that transmits a transmission wave to a predetermined search area and identifies a type of an object that reflects the transmission wave, based on detection results of a plurality of radar devices that detect the object by using a reflected wave received from the object, wherein:

the plurality of radar devices are arranged such that a search area of each of the radar devices has a different vertical height from a road surface, and the host vehicle blind spot monitoring system includes an engine control unit configured to:

acquire a detection point, at which the object has been detected for each search area, and distance information from the radar device to the detection point, identify the type of the object based on the distance information and a size of a detection area configured by the detection point, obtain a depth length of the object from the distance information, identify the object based on the depth length for each search area, acquire a reflection intensity of the detection point, identify the object based on the reflection intensity for each search area, and identify the type of the object as a cyclist when a difference between depth lengths of the object detected by an upper radar device and a lower radar device disposed in front of the host vehicle is large and a difference between reflection intensities detected by both radar devices is large.

6. A host vehicle blind spot monitoring system that transmits a transmission wave to a predetermined search area and identifies a type of an object that reflects the transmission wave, based on detection results of a plurality of radar devices that detect the object by using a reflected wave received from the object, wherein:

the plurality of radar devices are arranged such that a search area of each of the radar devices has a different vertical height from a road surface, and the host vehicle blind spot monitoring system includes an engine control unit configured to:

acquire a detection point, at which the object has been detected for each search area, and distance information from the radar device to the detection point, identify the type of the object based on the distance information and a size of a detection area configured by the detection point, obtain a depth length of the object from the distance information, identify the object based on the depth length for each search area, acquire a reflection intensity of the detection point, identify the object based on the reflection intensity for each search area, identify the type of the object as a cyclist when a difference between depth lengths of the object detected by an upper radar device and a lower radar device disposed in front of the host vehicle is large and a different between reflection intensities detected by both radar devices is large, identify the type of the object as a preceding vehicle when absolute values of the reflection intensities detected by both radar devices are large, and identify the type of the object as a pedestrian when the absolute values of the reflection intensities detected by both radar devices are small.

7. A host vehicle blind spot monitoring system that transmits a transmission wave to a predetermined search area and identifies a type of an object that reflects the transmission wave, based on detection results of a plurality of radar devices that detect the object by using a reflected wave received from the object, wherein:

the plurality of radar device are arranged such that a search area of each of the radar devices has a different vertical height from a road surface, and the host vehicle blind spot monitoring system includes an engine control unit configured to:

acquire a detection point, at which the object has been detected for each search area, and distance information from the radar device to the detection point, identify the type of the object based on the distance information and a size of a detection area configured by the detection point, obtain a depth length of the object from the distance information, identify the object based on the depth length for each search area, and start object identification processing when Conditions 1 to 3 are satisfied:

(Condition 1) an object exists within a range of 0.8 m to 3.7 m in a traveling direction of the host vehicle;

(Condition 2) an object speed is 0 km/h to 10 km/h; and (Condition 3) the host vehicle travels straight and has a speed of 10 km/h or less.

*   *   *   *   *